United States Patent [19]
Ito et al.

[11] Patent Number: 4,800,413
[45] Date of Patent: Jan. 24, 1989

[54] READER PRINTER

[75] Inventors: Masahiko Ito, Yokohama; Masami Maetani, Ohmiya; Shinji Murata; Kazuhiko Onuki, both of Tokyo, all of Japan

[73] Assignee: Canon Kabushiki Kaisha, Tokyo, Japan

[21] Appl. No.: 79,539

[22] Filed: Jul. 30, 1987

[30] Foreign Application Priority Data

Aug. 8, 1986 [JP] Japan .................................. 61-186593
Aug. 14, 1986 [JP] Japan .................................. 61-190986

[51] Int. Cl.⁴ ............................................. G03B 13/28
[52] U.S. Cl. .......................................... 355/45; 355/5; 355/57; 355/60
[58] Field of Search ...................... 355/5, 8, 11, 51, 45, 355/55, 57, 60; 353/27 R

[56] References Cited

U.S. PATENT DOCUMENTS 4,056,318 11/1977 Watanabe .............................. 355/45
4,339,182 7/1982 Ueda et al. ......................... 355/45 X
4,349,271 9/1982 Toriumi et al. .......................... 35/60

Primary Examiner—Richard A. Wintercorn
Attorney, Agent, or Firm—Fitzpatrick, Cella, Harper & Scinto

[57] ABSTRACT

A reader printer includes a rotatable scanning mirror disposed in an optical path formed between a projection lens and a printer section in correspondence with a printer mode, the scanning mirror being rotated to perform scanning of an image and a movable mirror disposed near such a printer mode optical path for movement between an inserted position where it is inserted in the optical path and a retracted position to which it is retracted from the optical path. Movement of the movable mirror causes mutual switching between the printer mode optical path and the reader mode optical path.

11 Claims, 7 Drawing Sheets

READER PRINTER

BACKGROUND OF THE INVENTION

1. Field of the Invention

The present invention relates to a reader printer of the type in which the original images on a microfilm are projected onto a screen or a printer section.

2. Related Background Art

A typical reader printer comprises a projection optical system including a film illuminating section, a focusing lens and a plurality of fixed and movable mirrors. The respective movable mirrors are caused to displace and travel toward predetermined positions, thereby performing mutual switching between the reader mode and the printer mode of the reader printer and exposing a recording medium in a printer mechanism to a slit-shaped image projected thereon in the printer mode.

U.S. Pat. Nos. 4,367,033 and 4,589,767 disclose a typical form of projection system having the aforesaid arrangement. This arrangement includes three mirrors disposed on an image forming side of the focusing lens, the three microscope reflecting a portion of image forming light rays in the order of this arrangement so that an image in a slit-shaped portion of the original is formed onto a photosensitive medium (recording medium) in an exposure section. In this state, while the photosensitive medium is being caused to travel in the exposure section at an equal velocity, first and second ones of the three mirrors nearer the focusing lens are respectively caused to travel in predetermined directions, thereby exposing the photosensitive medium to the image projected thereon in a slit-like form.

However, the aforesaid type of projection system is arranged such that the first mirror directly opposing the focusing lens is scanned in parallel with and at 90 degrees with respect to the second mirror, and this may lead to various problems; for example, since the first mirror is unavoidably increased in size, the overall size of the system is correspondingly increased; it is necessary to employ a mirror having a reflection surface with high-precision flatness; and in addition, complicated adjustment is required to center the screen disposed in the reader mode optical path with respect to the photosensitive medium disposed in the printer mechanism.

SUMMARY OF THE INVENTION

It is therefore an object of the present invention to provide a reader printer which is reduced in size due to the miniaturization of a first mirror disposed in a printer mode optical path and in which it is possible to substantially eliminate the disagreement between the optical axes of the printer mode optical path and a reader mode optical path.

It is another object of the present invention to provide a reader printer which is reduced in size due to its simple and miniaturized scanning mechanism.

In brief, in accordance with the present invention, a scanning mirror is disposed in an optical path corresponding to the printer mode of a reader printer between a projection lens and an exposure section in which an optical image is formed in a slit-like form, the scanning mirror being changed from a predetermined first angled state to a predetermined second angled state as it is being rotated at an angular velocity synchronized with the speed of travel of the surface of a recording medium disposed in a printer section for the purpose of performing rotary scan of an optical image of the reader printer, thereby exposing the surface of the recording medium to the optical image thus projected in a slit-like manner. In addition, a movable mirror is disposed in the vicinity of an optical path corresponding to the printer mode, the movable mirror being freely changed between an inserted position where it is inserted in the printer mode optical path and a retracted position to which it is retracted from the inserted position.

This arrangement enables a remarkable reduction in the size of a rotary mirror disposed in the printer mode optical path for scanning an optical image, the reflection surface of the rotary mirror requiring high-precision flatness. Mutual switching between the printer mode optical path and the reader mode optical path is performed through the insertion and retraction of a single movable mirror into and from the printer mode optical path. This minimizes the degree of misalignment between the optical axes of the reader mode optical path and the printer mode optical path.

DESCRIPTION OF THE PREFERRED EMBODIMENTS

Preferred embodiments of the present invention will be described below with reference to the accompanying drawings.

Figure 1:
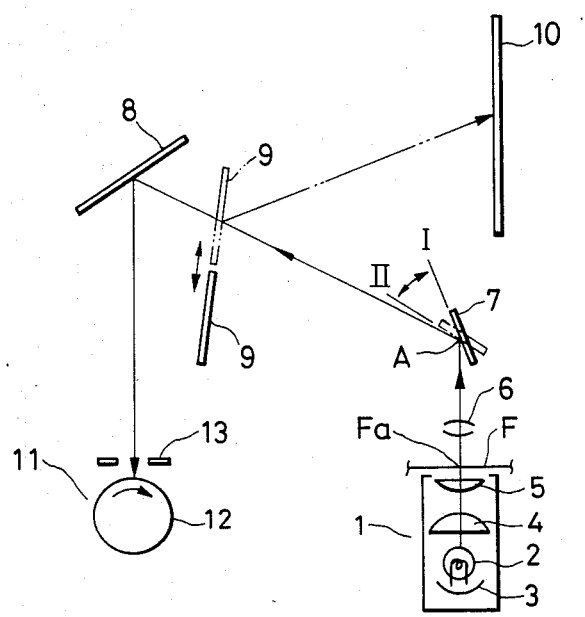
FIG. 1 is a diagram of a printer mode optical path which is assumed by a first preferred embodiment of a reader printer of the present invention.
Figure 2:
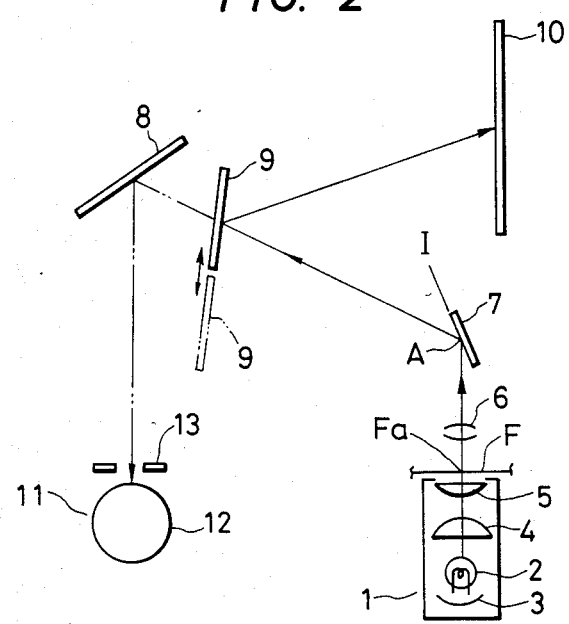
FIG. 2 is a diagram of a reader mode optical path which is assumed by the first embodiment.

Referring to FIGS. 1 and 2, a first preferred embodiment of this invention comprises a film illuminating section 1 including an illumination lamp 2, a concave reflection plate 3, a condenser lens 4 and a field lens 5. A microfilm is indicated at F, and an image Fa formed in a desired frame of the microfilm F is positioned on the optical axis of the aforesaid film illuminating section by manually or automatically moving the microfilm F. The first embodiment further comprises a projection lens 6, a first mirror 7, a second mirror 8, a third mirror 9 and a projection screen 10.

The first embodiment still further comprises a printer section 11 constituted by a transfer type electrophotographic copying machine or the like. FIG. 1 illustratively depicts a rotary photosensitive drum 12 and a slitted plate 13 which are combined to constitute the printer section 11, but, of course, the drum 12 has around its periphery various required image forming processing members such as an electrostatic charger, a developer, a transfer means and a cleaning means.

Figure 3:
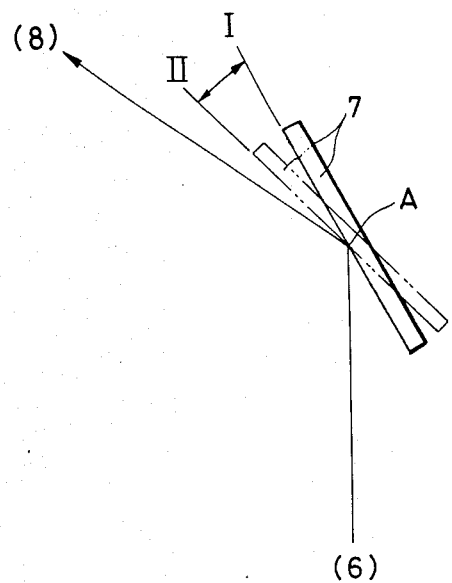
FIG. 3 is a diagram used for explaining the rotary scan effected by a first mirror used in the first embodiment.

The first mirror 7 is rotated back and forth about a horizontal axis A at a predetermined equal angular velocity, thus reciprocally moved between a first angled state I shown in solid line in FIGS. 1 and 3 to a second angled state II shown in two-dot chain line in the same Figures, and thus the first mirror 7 serves as a rotary mirror for scanning an optical image.

The third mirror 9 is operated to change its position with respect to the optical path formed between the first mirror 7 and the second mirror 8. More specifically, the third mirror 9 serves as a movable mirror which is movable between an inserted position where it is inserted in the optical path and a retracted position to which it is retracted from the optical path, these positions being shown by solid lines in FIGS. 2 and 1, respectively. The third mirror or movable mirror 9 has a flat reflection surface, and is moved back and forth in the directions parallel to the flat reflection surface so as to change the optical path.

The operation of the first embodiment will be described below in detail.

(1) Reader Mode

When the reader mode is selected, the first mirror 7 is maintained in the first angled state I as shown in FIG. 2 and the third mirror 9 is inserted into the optical path formed between the first mirror 7 and the second mirror 8, and is maintained at the inserted position, thereby constituting an optical path corresponding to the reader mode. Specifically, the reader mode optical path starts from the film illuminating section 1, passing through the projection lens 6, reflected by the first mirror 7 and then by the third mirror 9, and terminating on the screen 10. Thus, the image Fa in a desired frame of the microfilm F located on the optical axis of the film illuminating section 1 is projected on the screen 10 in the form of an enlarged still image.

(2) Printer Mode

In the aforesaid state, when a control circuit (not shown) receives a print command signal, the third mirror 9 is retracted from the optical path between the first mirror 7 and the second mirror 8 as shown in FIG. 1 and is maintained at the retracted position. When the mirror 9 has been completely retracted, the optical path corresponding to the aforesaid reader mode is switched to that corresponding to the printer mode. Specifically, the printer mode optical path starts from the film illuminating section 1, passing through the projection lens 6, reflected by the first mirror 7 and then by the second mirror 8, and terminating on the photosensitive drum 12.

When the retraction of the third mirror 9 has been completed, the first mirror 7 is rotated about the horizontal axis A (FIG. 3) at a predetermined equal angular velocity synchronized with the circumferential velocity (or velocity of travel of the surface) of the photosensitive drum 12 serving as a recording medium in the printer section 11, thereby being changed from the first angled state I shown in solid line in FIGS. 1 and 3 to the second angled state II shown in two-dot chain line in the same Figures.

The rotary scan of the first mirror 7 allows the image Fa in the desired frame of the microfilm F to be projected onto the peripheral surface of the rotating photosensitive drum 12 in the manner of slit-shaped exposure (primary scanning exposure) via the optical path formed by the first mirror 7, the second mirror 8 and the slitted plate 13. In consequence, the printer section 11 prints out an enlarged copy corresponding to the desired film image Fa.

(3) Position Change Mechanism for Third Mirror

The position change mechanism for the third mirror 9 is constituted, for example, using a rack and pinion. As illustratively depicted in FIG. 4, a support plate 20 supporting the mirror 9 is carried by guide rail means (not shown) for sliding movement therealong upwardly and downwardly between a predetermined inserted position (solid line position of FIG. 4) and a predetermined retracted position (two-dot chain line position of FIG. 4) with respect to the optical path formed between the first mirror 7 and the second mirror 8. The support plate 20 for the mirror 9 is provided with a vertically extending rack 21 engaged with a pinion 22.

Thus, the forward and reverse drive of the pinion 22 causes movement of the mirror 9 between the inserted position and the retracted position with respect to the optical path.

(4) Rotary Scanning Mechanism for First Mirror

Figure 5:
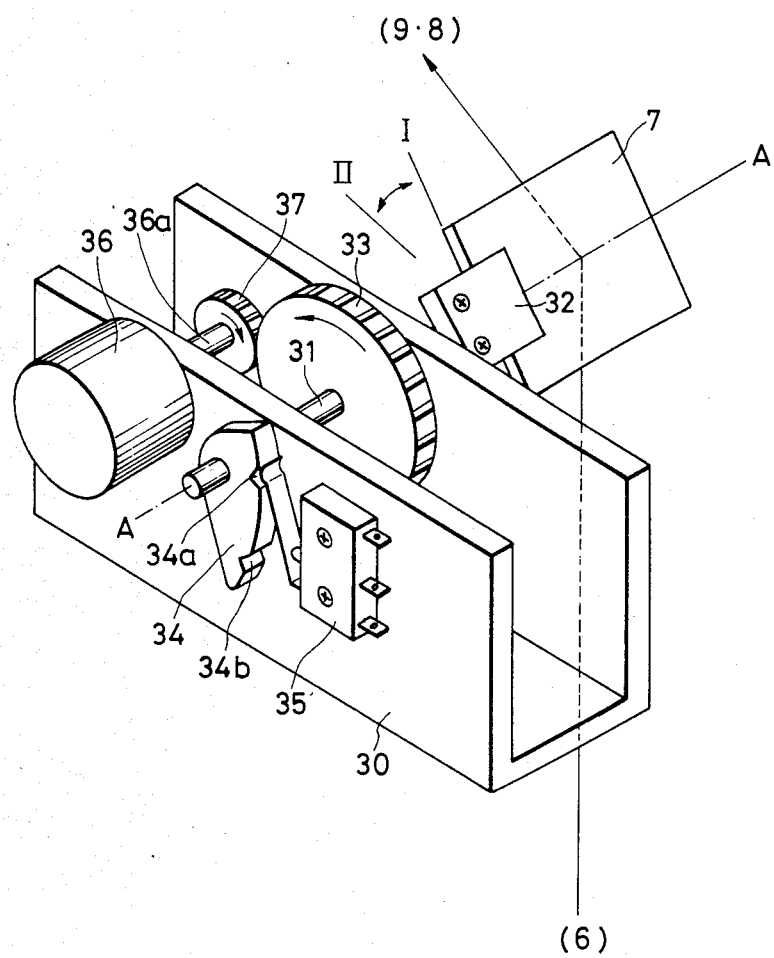
FIG. 5 is a diagrammatic, perspective view of one example of a drive mechanism for causing rotation of the first mirror used in the first embodiment.

Referring to FIG. 5 illustratively depicting the rotary scanning mechanism, a stationary support member is indicated at 30, and a crosswise shaft 31 is journalled in the support member 30. A mirror holder 32 is integral with one end of the crosswise shaft 32, and firmly clamps the first mirror 7. An axis A—A of the crosswise shaft 31 extends through a plane of the reverse surface of the mirror 7 opposite to its light reflecting surface, and the mirror 7 is rotated about the axis A—A.

A gear 33 is fixed to an intermediate portion of the crosswise shaft 31, and a cam plate 34 is fixed to the opposite end portion of the crosswise shaft 31. A microswitch 35 associated with the cam plate 34 is disposed at a predetermined position on one side surface of the support member 30. A reversible motor 36 is attached to the same side surface of the support member 30. A gear 37 is fixed to a rotary shaft 36a extending from the motor 36, and is engaged with the gear 33 fixed to the crosswise shaft 31.

The first mirror 7 is usually maintained in an angled state as shown in FIG. 5 in which an elongated actuator attached to the microswitch 35 drops in a first notch 34a formed in the cam plate 34. This angled state corresponds to the aforesaid first angled state I. Also, the third mirror 9 is inserted in the optical path between the first mirror 7 and the second mirror 8. Thus, the reader printer assumes the reader mode optical path (FIG. 2).

Figure 4:
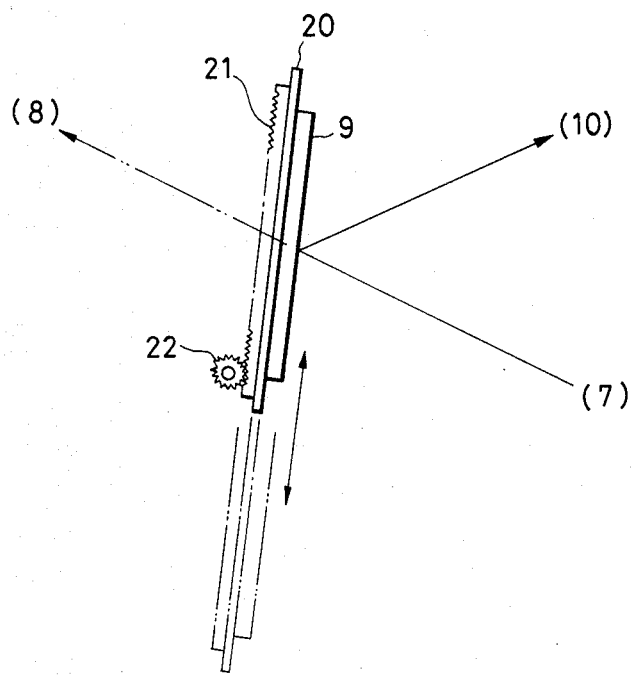
FIG. 4 is a diagrammatic, side elevational view of one example of a mechanism incorporated in the first embodiment for causing displacement of a third mirror so as to change the optical path of the reader printer.

In this state, when the control circuit (not shown) receives a print command signal, the pinion 22 shown in FIG. 4 is reversed to cause the third mirror 9 to retract from the optical path formed between the first mirror 7 and the second mirror 8, thereby switching the optical path from the reader mode of FIG. 2 to the printer mode of FIG. 1.

Subsequently, when the reversible motor 36 is energized in the forward direction, the forward torque of the gear 37 is transmitted to the first mirror 7 via the gear 33 and the crosswise shaft 31. Thus, the first mirror 7 is rotated about the axis A of the crosswise shaft 31 at a predetermined equal angular velocity synchronized with the circumferential velocity of the photosensitive drum 12 incorporated in the printer section 11, and thus the first mirror 7 performs its rotary scan while it is being moved from the first angled state I shown in solid line in FIGS. 1 and 3 to the second angled state II shown in two dot chain line in the same Figures.

The rotary scan of the first mirror 7 allows the image Fa in the desired frame of the microfilm F to be projected onto the peripheral surface of the rotating photosensitive drum 12 in the manner of slit-shaped exposure so that the printer section 11 prints out an enlarged copy corresponding to the desired film image Fa.

The forward energization of the motor 36 is shut off when the elongated actuator of the microswitch 35 drops in a second notch 34b formed in the cam plate 34 which is rotated in unison with the crosswise shaft 31, thereby terminating the aforesaid rotary scan of the first mirror 7.

Immediately after the forward energization of the motor 36 has been shut off, the motor 36 is energized in the reverse direction. Thus, the first mirror 7 is rotated in the reverse direction toward the first angled state I shown in solid line in FIG. 3, that is, the angled state shown in FIG. 5 in which the actuator of the microswitch 35 drops in the first notch 34a in the cam plate 34.

For a multi-copy operation, the aforesaid cycle of rotary scan and reverse rotation of the first mirror 7 is repeated by preset times, thereby printing out a required number of copies by means of the printer section 11.

When the rotary scan of first mirror 7 for a single copy or the final copy of a multi-copy operation has been completed and the first mirror 7 has been reversed to the initial angled state I, the pinion 22 provided on the third mirror 9 is driven in the forward direction to cause the mirror 9 to move into the optical path between the first mirror 7 and the second mirror 8. Thus, the optical path of the reader printer is switched from the printer mode of FIG. 1 to the reader mode of FIG. 2.

Mutual switching between the reader mode and the printer mode through the bidirectional movement of the third mirror 9 may be carried out by operating the support plate 20 through a manual mechanism.

As described above, in accordance with the present invention, it is possible to remarkably miniaturize the rotary mirror (the first mirror 7) operable for scanning an optical image along the printer mode optical path, the rotary mirror usually requiring high-precision surface flatness. Also, since the rotary mirror is capable of rotating in a reduced angle range and thus requires no large space, the position change mechanism for the movable mirror can be simplified and reduced in size. The switching between the reader mode optical path and the printer mode optical path is performed by means of the insertion and retraction of a single movable mirror (the third mirror 9) into and from the optical path; accordingly, the two optical paths can separately be optically adjusted and it is thus easy to align the center of the screen with the optical axis of the recording medium in the printer section. This enables substantial elimination of optical deviation attributed to mode switching.

Figure 6:
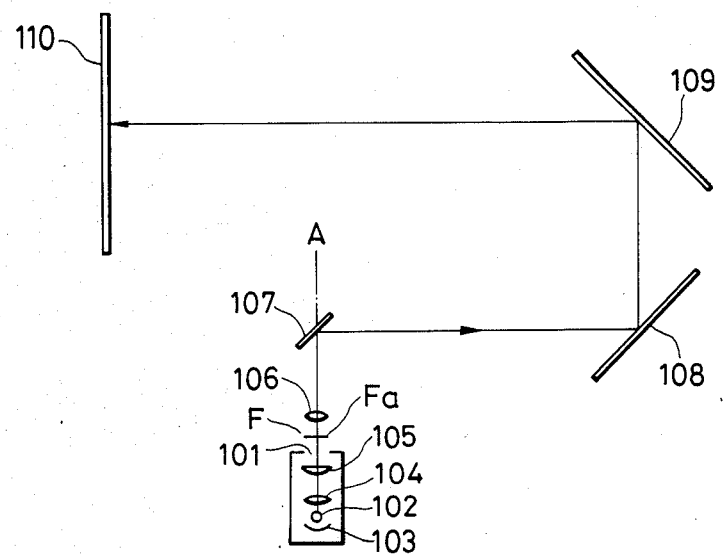
FIG. 6 is a diagrammatic of a second preferred embodiment of the reader printer of the present invention and showing its reader mode optical path.
Figure 7:
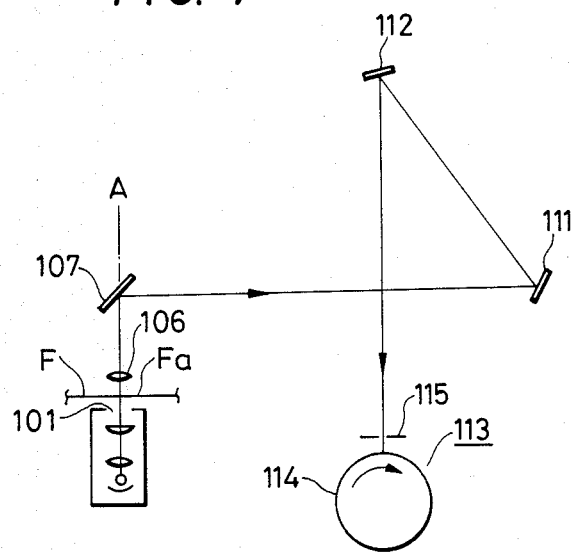
FIG. 7 is a diagram of the printer mode optical path assumed by the second embodiment shown in FIG. 6.
Figure 8:
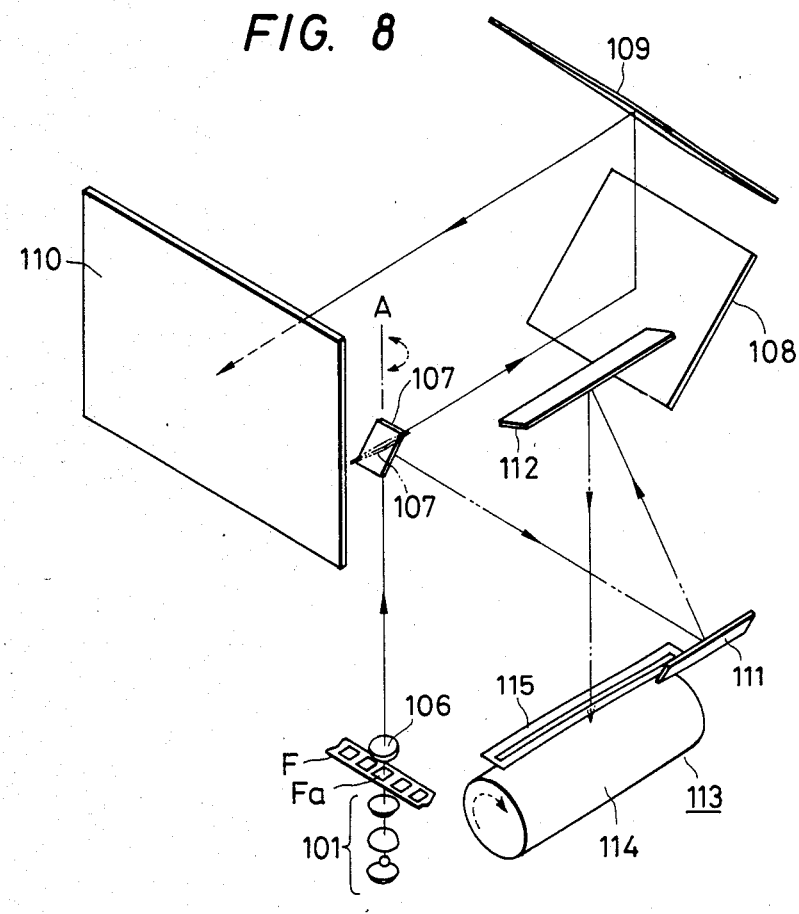
FIG. 8 is a diagrammatic, perspective view of the optical paths shown in FIGS. 6 and 7.

FIGS. 6 to 8 show the second preferred embodiment of the reader printer in the present invention. FIG. 6 shows the optical path assumed by this embodiment in the reader mode, FIG. 7 showing the optical path assumed by this embodiment in accordance with the printer mode, and FIG. 8 showing these optical paths in perspective.

As shown in FIGS. 6 to 8, the second embodiment comprises a film illuminating section 101 including an film illuminating lamp 102, a concave reflection plate 103, a condenser lens 104 and a field lens 105. A microfilm is indicated at F, and an image Fa formed in a desired frame of the microfilm F is manually or automatically positioned on the optical axis of the film illumination section 101. The second embodiment further comprises a projection lens 106, a first mirror 107, second and third mirrors 108 and 109 disposed along the reader mode optical path, a projection screen 110 and fourth and fifth mirrors 111 and 112 disposed along the printer mode optical path. Incidentally, the second to fifth mirrors 108, 109, 111 and 112 are fixedly disposed. The first mirror 107, as described later, is a movable mirror arranged to be rotated to change the optical path of the reader printer and to perform rotary scan for effecting slit-shaped exposure. The first mirror 107 is usually maintained in the state of being angled about 45° downwardly from the horizon.

The second embodiment still further comprises a printer section 113 such as a transfer type electrophotographic copying machine. FIG. 7 illustratively depicts a rotary photosensitive drum 114 and a slitted plate 115 which are combined to constitute the printer section 113, but, of course, the drum 114 has around its periphery various required image forming processing members such as an electrostatic charger, a developer, a transfer means and a cleaning means.

(a) Reader Mode

When the reader mode is selected, the first mirror 107 is manually switched to and maintained in a first angled state as shown in solid line in FIGS. 6 and 8 in which the reflection surface thereof is opposed to that of the second mirror 108 disposed in the reader mode optical path, thereby constituting an optical path corresponding to the reader mode. Specifically, the reader mode optical path starts from the film illuminating section 101, passing through the projection lens 106, reflected by the first mirror 107 and then by the second mirror 109, and terminating on the screen 110. Thus, the image Fa in a desired frame of the microfilm F located on the optical axis of the film illuminating section 101 is projected on the screen 110 in the form of an enlarged still picture.

(b) Printer Mode

When the printer mode is selected, the first mirror 107 is automatically or manually rotated about a longitudinal axis A (or first axis) through about 90°, as shown in two-dot chain line in FIGS. 8 and 7, from the aforesaid first angled state to a second angled state in which the reflection surface of the first mirror 107 is opposed to that of the fourth mirror 111 disposed in the printer mode optical path, and is maintained in this angled state. Specifically, the printer mode optical path starts from the film illuminating section 101, passing through the projection lens 106, reflected by the first mirror 107, then by the fourth mirror 111 and then by the fifth mirror 112, passing through the slitted plate 115 and terminating on the photosensitive drum 12. In this case, even if the screen 110 disposed on the reader mode optical path reflects light toward the third mirror 109 and the thus reflected light reaches the first mirror 107 via the second mirror 108, since the first mirror 107 is angled in non-opposed relation to the second mirror 108, the light entering from the reader mode optical path is blocked from the printer made optical path. It is therefore possible to prevent the light from leaking from the reader mode optical path into the printer mode optical path.

Figure 9:
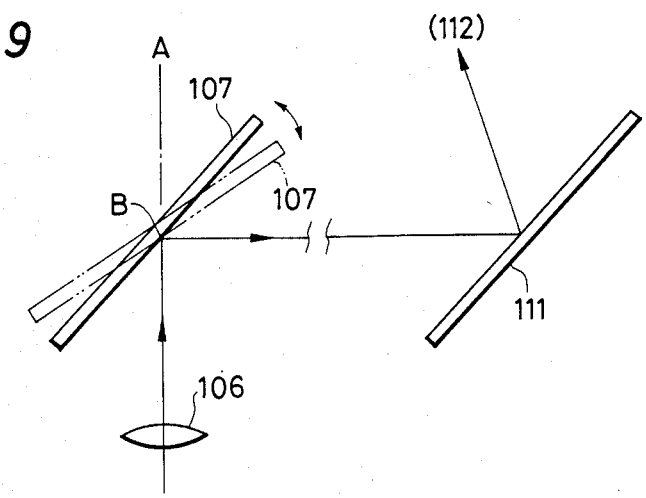
FIG. 9 is a diagram used for explaining the rotary scan effected by a first mirror used in the second embodiment.

The first mirror 107 is switched to the second angled state corresponding to the printer mode and the first mirror 107 is rotated about a lateral axis B normal to the aforesaid longitudinal axis A at a predetermined equal angular velocity synchronized with the circumferential velocity (or velocity of travel of the surface) of the photosensitive drum 114 serving as a recording medium in the printer section 113, thereby being changed from a third angled state (initial scanning angled state) shown in solid line in FIG. 9 to a fourth angled state (final scanning angled state) shown in two-dot chain line in the same Figures.

The rotary scan of the first mirror 107 allows the image Fa in the desired frame of the microfilm F to be projected onto the peripheral surface of the photosensitive drum 114 in the manner of slit-shaped exposure (primary scanning exposure) via the optical path formed by the fourth mirror 111, the fifth mirror 112 and the slitted plate 115. In consequence, the printer section 113 prints out an enlarged copy corresponding to the desired film image Fa.

(3) Mechanism for Effecting Rotary and Scanning Motions of First Mirror

FIGS. 10 to 13B show the mechanism by means of which the first mirror 107 is rotated and scanned.

Figure 10:
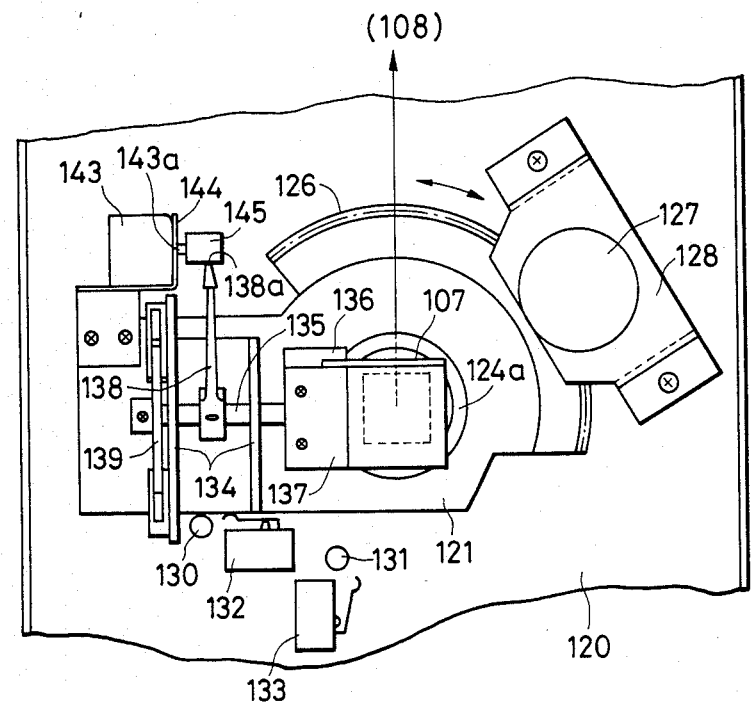
FIG. 10 is a diagrammatic, top plan view of a drive mechanism incorporated in the second embodiment, in which the first mirror is maintained in a first angled state corresponding to the reader mode of the second embodiment.
Figure 11:
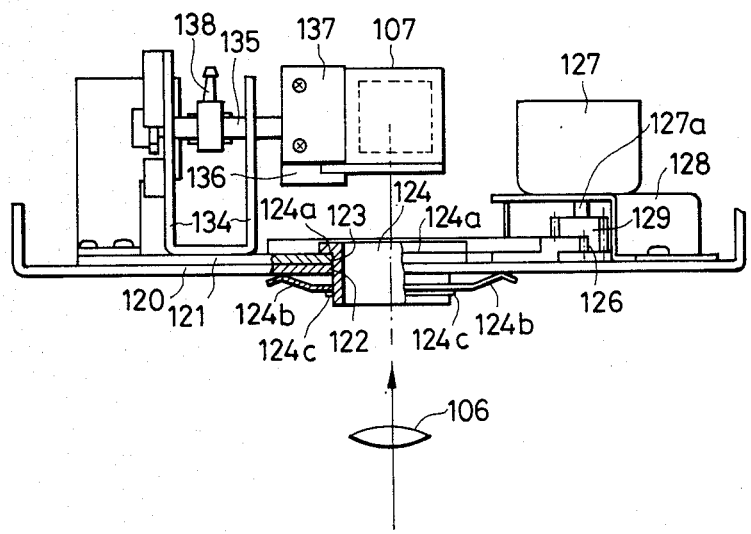
FIG. 11 is a partially cut away, front elevational view of the drive mechanism shown in FIG. 10, in which the first mirror is maintained in the same angled state.
Figure 12:
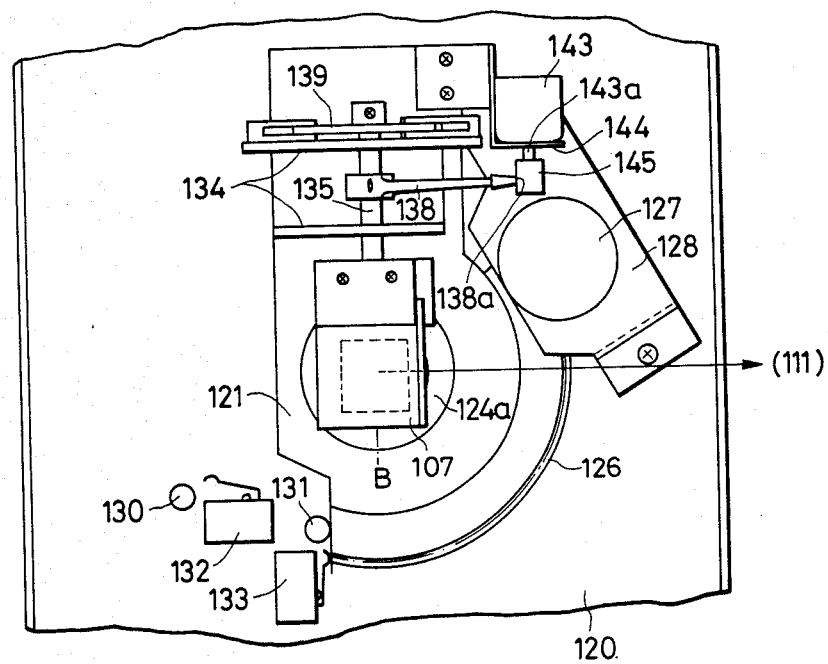
FIG. 12 is a diagrammatic, top plan view of the drive mechanism shown in FIG. 10, in which the first mirror is maintained in a second angled state corresponding to the printer mode of the embodiment.
Figure 13A:
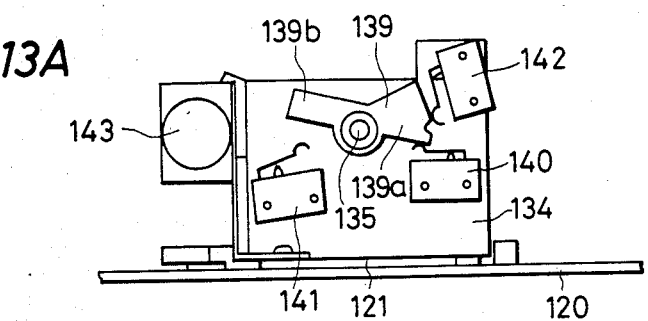
FIGS. 13A and 13B are respectively diagrammatic illustrations of the motion of a cam plate attached to the second embodiment.
Figure 13B:
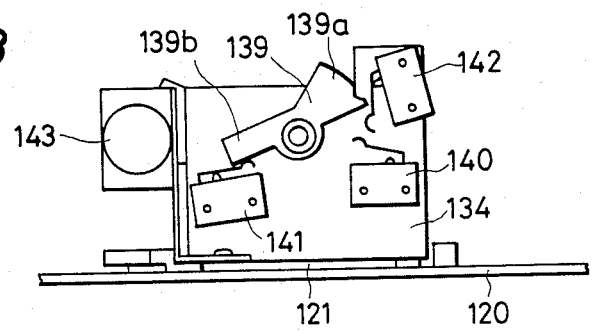

FIG. 10 is a top plane view of such a mechanism and shows a state wherein the first mirror 107 is maintained in the reader mode, that is, in a first angled state, with FIG. 11 being a partially cut away, front elevational view of the state shown in FIG. 10. FIG. 12 is a top plane view of such a mechanism, but shows a state wherein the first mirror 107 is maintained in the printer mode, that is, in a second angled state. FIGS. 13A and 13B are side elevational views of the portion of such a mechanism provided with a cam plate.

Throughout these Figures, a fixed horizontal platform is indicated at 120 and a horizontal rotary plate 121 is disposed on the top of the platform 120.

The rotary plate 121 has a substantially central circular opening 123 as shown in FIG. 11, and the horizontal platform 120 also has a substantially central circular opening 122 equivalent in diameter to the circular opening 123. The rotary plate 121 overlies the horizontal platform 120 such that the opening 123 axially agrees with the opening 122. The openings 123 and 122 thus agreed with each other receives a short cylinder 124 having a flange 124a around its upper edge, and a leaf spring washer 124b is fitted onto the upper end portion of the short cylinder 124. The leaf spring washer 124 presses against the upper surface of the platform 120, and a washer 124c is fitted onto the outer surface of the short cylinder 124 so as to prevent the leaf spring washer 124 from coming off the same. With this arrangement, the rotary plate 121 is rotatable about the axis of the short cylinder 124 on the top of the platform 120 in the clockwise and counterclockwise directions as viewed in FIG. 10 without fluctuating in the horizontal and vertical directions.

A horizontal sector gear 126 is integral with the rotary plate 121, and a first reversible motor 127 is disposed via a metal support 128 on the platform 120. As shown in FIG. 11, a gear 129 is fixed to a downwardly extending rotary shaft 127a of the motor 127. The gear 129 is meshed with the sector gear 126 of the rotary plate 121. Accordingly, when the motor 127 is driven in the forward direction, the rotary plate 121 is rotated about the axis of the short cylinder 124 in the clockwise direction as viewed in FIG. 10. On the other hand, when the motor 127 is reversed, the rotary plate 121 is rotated in the counterclock direction as viewed in FIG. 10.

A first stopper pin 130 and a second stopper pin 131 are disposed so as to limit the angle of rotation of the rotary plate 121. A first microswitch 132 is disposed so as to detect the engagement or disengagement between the rotary plate 121 and the first stopper pin 130 while a second microswitch 133 is disposed so as to detect the engagement or disengagement between the rotary plate 121 and the second stopper pin 131. These microswitches 132 and 133 are disposed on the platform 120 at predetermined positions thereof.

A metal-mode bearing member 134 having a rectangular C-shaped cross-sectional form is fixed to the top of the rotary plate 121, and a horizontal shaft 135 is journalled in the bearing member 134. A mirror holder 136 is fixed to one end of the horizontal shaft 135, and a leaf spring 137 is fixed to the mirror holder 136 by machine screws. The first mirror 107 is firmly clamped between the holder 136 and the leaf spring 137.

An arm 136 is fixed at its base to an intermediate portion of the horizontal shaft 135 and extends in the direction substantially normal to the horizontal shaft 135. A cam plate 139 is fixed to the other end of the lateral shaft 135, and, as shown in FIGS. 13A and 13B, third, fourth and fifth microswitches 140, 141 and 142 are disposed in association with the cam plate 139 at predetermined positions on the outer surface of the bearing member 134 opposite to the rotary plate 121.

A second reversible motor 143 is supported via a leaf spring support plate 144 on the rotary plate 121, and a pulley 145 is fixed to a rotary shaft 143a of the motor 143. The pulley 145 is maintained in pressure contact with one end 138a of the arm 138 under the resiliency of the leaf spring support plate 144. The end 138a of the arm 138 is precisely machined such as to travel along the circumference of the circle having a radius equivalent to the length of the arm 138. The arm 138 serves to amplify the small scanning angle of the first mirror 107 by its arm length.

As shown in FIG. 11, the axis of the short cylinder 124 which is the axis of rotation of the rotary plate 121 substantially agrees with the optical axis of the projection lens 106, and the first mirror 107 held by the holders 136 and 137 of the horizontal shaft 135 is positioned above the short cylinder 124.

The mechanism for effecting rotary and scanning motions of the first mirror 107 as a whole has the above-described structure. The following is a description of the operation of the aforesaid mechanism.

(a) Reader Mode

When the reader mode is selected, the rotary plate 121 is engaged with the first stopper pin 130, and is maintained at the angle of rotation shown in FIG. 10. Also, this angle of rotation is detected by the first microswitch 132, and the resultant detection signal is supplied to a control circuit (not shown).

The first mirror 107 is maintained in an angled state wherein a first arm 139a of the cam plate 139 engages with and turns on an actuator of the third microswitch 140 as shown in FIG. 13A.

With this arrangement, the first mirror 107 is maintained at the first angled state shown in solid line in FIGS. 6 and 8 such that its reflection surface assumes opposed relationship with the reflection surface of the second mirror 108 disposed in the reader mode optical path, thus constituting the reader mode optical path as described in the above item (1). In consequence, the image Fa formed in a desired frame of the microfilm F is projected on the screen 110 on an enlarged scale.

(b) Printer Mode

In the aforesaid state, when the control signal receives a print command signal, the first motor 127 is energized in the forward direction and the rotary plate 121 is thus rotated about the axis of the short cylinder 124 in the clockwise direction as viewed in FIG. 10. When rotated through substantial 90°, the rotary plate 121 engages with the second stopper pin 131 as shown in FIG. 12, and a further clockwise rotation thereof is prevented. Simultaneously, the engagement is detected by the second microswitch 133 and the forward motion of the first motor 127 is stopped in response to the resultant detection signal.

With this arrangement, the first mirror 107 is maintained in the second angled state shown in two-dot chain line in FIGS. 7 and 8 and solid line in FIG. 9 such that its reflection surface assumes opposed relationship with the reflection surface of the fourth mirror 111 disposed in the printer mode optical path, thus constituting the reader mode optical path as described in the above item (2).

Immediately after the forward motion of the first motor 127 has been stopped, the second motor 143 is energized in the forward direction. The forward torque of the pulley 145 is transmitted to the first mirror 107 through the arm 138 and the horizontal shaft 135, and the first mirror 107 is rotated about the axis B of the horizontal shaft 135, as shown in FIG. 9, from a third angled state shown in solid line to an angled state shown in two dot chain line at a predetermined angular velocity synchronized with the rotational speed of the photosensitive drum 114 of the printer mechanism 113, thereby effecting rotary scan.

The rotary scan of the first mirror 107 allows the image Fa in the desired frame of the microfilm F to be projected onto the peripheral surface of the rotating photosensitive drum 114 in the manner of slit-shaped exposure. In consequence, the printer section 113 prints out an enlarged copy corresponding to the desired film image Fa.

As shown in FIG. 13B, when a second arm 139b of the cam plate 139 engages with and turns on the actuator of the fourth microswitch 141, the forward energization of the second motor 143 is shut off, thereby terminating the aforesaid rotary scan of the first mirror 107.

Immediately after the forward energization of the second motor 143 has been shut off, the second motor 143 is energized in the reverse direction so that the first mirror 107 is reversed to the initial angled state shown in solid line in FIG. 9.

For a multi-copy operation, the aforesaid cycle of rotary scan and reverse rotation of the first mirror 107 is repeated by preset times so that the printer section 113 print out a required number of copies.

When the rotary scan of first mirror 107 for a single copy or the final copy of a multi-copy operation has been completed and the first mirror 107 has been reversed to the initial angled state shown in solid line in FIG. 9, the first motor 127 is energized in the reverse direction to cause the rotary plate 121 to rotate about the axis of the short cylinder 124 in the counterclockwise direction as viewed in FIG. 12. When the rotary plate 121 is rotated through substantial 90° and engages with the first stopper pin 130 as shown in FIG. 10, this engagement is detected by the first microswitch 132 and thus the reverse energization of the first motor 127 is shut off.

Specifically, the first mirror 107 is automatically reversed to the first angled state in which its reflection surface assumes opposed relationship with the reflection surface of the second mirror 108 to constitute the reader mode optical path.

Mutual switching between the reader mode and the printer mode through the bidirectional movement of the first mirror 107 may be carried out by manually operating the rotary plate 121.

In the aforesaid second embodiment, since mutual switching between the reader mode and the printer mode is effected through the rotary switching of the first mirror about the first axis between the first and second positions, it is possible to miniaturize the first mirror usually requiring a high degree of precision of surface flatness. Also, when an image is to be projected onto the peripheral surface of the recording medium in the printer mode in the manner of slit-shaped exposure, the first mirror switched to the second position is rotated about the second axis which extends in a direction different from that of the first axis for the purpose of rotary scan. Accordingly, since the first mirror functions to change the optical path and also to scan an optical image, it is possible to dispose the drive mechanism collectively at a single location, whereby the space required for the movement of the mirror is reduced and the reader printer can be reduced in size.

What is claimed is:

1. A reader printer comprising:
   a focusing lens for focusing light rays passing therethrough:
   first optical means for directing light rays passing through said focusing lens to a movable recording medium, said first optical means including a rotatable first mirror;
   drive means for rotating said first mirror from a first angled state to a second angled state at a constant speed during movement of the recording medium;
   second optical means for directing light rays reflected from said first mirror toward a screen, said second optical means including a second mirror movable between an inserted position wherein it is inserted in a reflection optical path formed by reflection from said first mirror and a retracted position wherein it is retracted from the reflection optical path; and
   means for moving said second mirror in a direction substantially parallel to its reflection surface.

2. A reader printer comprising:

a focusing lens for focusing light rays passing therethrough;

first optical means for directing light rays passing through said focusing lens to a predetermined location for exposure of a recording medium movable along the location, said first optical means including a rotatable first mirror;

drive means for rotating said first mirror from a first angled state to a second angled state in synchronism with the velocity of travel of the recording medium;

second optical means for directing light rays reflected from said first mirror toward a screen, said second optical means including a second mirror movable between an inserted position wherein it is inserted in a reflection optical path formed by reflection from said first mirror and a retracted position wherein it is retracted from the reflection optical path; and means for moving said second mirror in a direction substantially parallel to its reflection surface.

3. A reader printer according to claim 1, wherein, when said second mirror is inserted into the reflection optical path formed by reflection from said first mirror, said first mirror is positioned in the first angled state.

4. A reader printer according to claim 3, wherein, when said second mirror is retracted from the reflection optical path formed by reflection from said first mirror, said first mirror is rotated from the first angled state to the second angled state, so that light rays reflected from said first mirror during its rotation are projected to the recording medium for exposure thereof.

5. A reader printer comprising:

a focusing lens for focusing light rays passing therethrough;

a mirror for reflecting light rays passing through said focusing lens;

first optical means for directing light rays reflected from said mirror onto a screen;

second optical means for directing light rays reflected from said mirror to a predetermined location for exposure;

first device means for rotating said mirror about a first axis so as to reflect light rays passing through said focusing lens toward one of said first optical means and said second optical means; and second drive means for rotating said mirror about a second axis different from the first axis so as to scan light rays reflected from said mirror on said predetermined location for exposure.

6. A reader printer according to claim 5, wherein the first axis is parallel to the optical axis of said focusing lens while said second axis intersects the optical axis.

7. A reader printer according to claim 5, wherein said mirror is rotated about the first axis between a first angled state and a second angled state, and said mirror reflects light rays toward said first optical means when assuming the first angled state while, when assuming the second angled state, said mirror reflects light rays toward said second optical means.

8. A reader printer according to claim 5, wherein a recording medium is movable along the location for exposure, and said second drive means rotates said mirror in synchronization with the speed of travel of the recording medium.

9. A reader printer according to claim 7, wherein said mirror is rotated about the second axis between a third angled state and a fourth angled state, said mirror being maintained in the third angled state when assuming the first angled state while, when assuming the second angled state, said mirror is rotated from the third angled state to the fourth angled state.

10. A reader printer according to claim 5, wherein said first drive means supports said mirror and includes support means rotatable about the first axis and a motor for rotating said support means.

11. A reader printer according to claim 10, wherein said first drive means is disposed on said support means for rotation in unison with said support means.

* * * * *

UNITED STATES PATENT AND TRADEMARK OFFICE
CERTIFICATE OF CORRECTION

PATENT NO. : 4,800,413

DATED : January 24, 1989

INVENTOR(S) : MASAHIKO ITO, ET AL.

It is certified that error appears in the above-identified patent and that said Letters Patent is hereby corrected as shown below:

COLUMN 1

Line 19, "Pat." should read --Patent--.
    Line 23, "microscope" should read --mirrors--.

COLUMN 7

Line 12, "made" should read --mode--.

COLUMN 11

Line 26, "state," should read --state.--.

Signed and Sealed this

Fifth Day of December, 1989

*Attest:*

JEFFREY M. SAMUELS

*Attesting Officer*    *Acting Commissioner of Patents and Trademarks*